(12) United States Patent
Ma et al.

(10) Patent No.: US 11,972,740 B2
(45) Date of Patent: Apr. 30, 2024

(54) FIELD SEQUENTIAL LIQUID CRYSTAL DISPLAY DEVICE

(71) Applicant: WUHAN CHINA STAR OPTOELECTRONICS TECHNOLOGY CO., LTD., Wuhan (CN)

(72) Inventors: Changwen Ma, Wuhan (CN); Zhou Zhang, Wuhan (CN); Guowei Zha, Wuhan (CN)

(73) Assignee: Wuhan China Star Optoelectronics Technology Co., Ltd., Hubei (CN)

( * ) Notice: Subject to any disclaimer, the term of this patent is extended or adjusted under 35 U.S.C. 154(b) by 0 days.

(21) Appl. No.: 17/435,019

(22) PCT Filed: Jun. 7, 2021

(86) PCT No.: PCT/CN2021/098574
§ 371 (c)(1),
(2) Date: Dec. 1, 2022

(87) PCT Pub. No.: WO2022/246904
PCT Pub. Date: Dec. 1, 2022

(65) Prior Publication Data
US 2024/0013746 A1 Jan. 11, 2024

(30) Foreign Application Priority Data
May 25, 2021 (CN) .......................... 202110571326.X (51) Int. Cl.
*G09G 3/36* (2006.01)
*G06F 3/044* (2006.01)
(Continued)

(52) U.S. Cl.
CPC .......... *G09G 3/3688* (2013.01); *G06F 3/044* (2013.01); *G06V 40/1318* (2022.01);
(Continued)

(58) Field of Classification Search
CPC ............... G09G 3/3413; G09G 3/3688; G09G 2310/0235; G09G 2310/061; G09G 2354/00; G06F 3/044; G06V 40/1318
See application file for complete search history.

(56) References Cited

U.S. PATENT DOCUMENTS 6,903,716 B2 * 6/2005 Kawabe ............... G09G 3/3648
348/556
8,766,906 B2 * 7/2014 Yoshida ............... G09G 3/2074
345/94
(Continued)

FOREIGN PATENT DOCUMENTS

CN 101373573 A 2/2009
CN 101980332 A 2/2011
(Continued)

*Primary Examiner* — Joe H Cheng
(74) *Attorney, Agent, or Firm* — PV IP PC; Wei Te Chung; Zhigang Ma (57) ABSTRACT

The present application provides a field sequential liquid crystal display device. The field sequential liquid crystal display device includes a liquid crystal display module including a plurality of display data writing periods and a plurality of blank periods, wherein between every two adjacent ones of the display data writing periods is provided with one of the plurality of blank periods, and the liquid crystal display module is configured to receive a display data during the plurality of the display data writing periods; and a functional module is configured to detect a functional data in at least one of the plurality of blank periods.

20 Claims, 4 Drawing Sheets

(51) Int. Cl.
*G06V 40/13* (2022.01)
*G09G 3/34* (2006.01)
(52) U.S. Cl.
CPC ... *G09G 3/3413* (2013.01); *G09G 2310/0235* (2013.01); *G09G 2310/061* (2013.01); *G09G 2354/00* (2013.01)

(56) References Cited

U.S. PATENT DOCUMENTS

| | | | | |
|---|---|---|---|---|
| 10,891,002 | B2 * | 1/2021 | Feng | G06F 3/04166 |
| 2009/0051631 | A1 * | 2/2009 | Okumura | G09G 3/3413 345/84 |
| 2020/0242995 | A1 | 7/2020 | Han | |

FOREIGN PATENT DOCUMENTS

| | | |
|---|---|---|
| CN | 102496352 A | 6/2012 |
| CN | 108664163 A | 10/2018 |
| CN | 108764081 A | 11/2018 |
| CN | 109037474 A | 12/2018 |
| CN | 109445182 A | 3/2019 |
| CN | 110928068 A | 3/2020 |
| CN | 111158527 A | 5/2020 |
| CN | 111176486 A | 5/2020 |
| CN | 112183320 A | 1/2021 |
| JP | 3919877 B2 * | 5/2007 |
| WO | 2011016541 A1 | 2/2011 |

* cited by examiner

FIG. 8

FIELD SEQUENTIAL LIQUID CRYSTAL DISPLAY DEVICE

RELATED APPLICATIONS

This application is a Notional Phase of PCT Patent Application No. PCT/CN2021/098574 having international filing date of Jun. 7, 2021, which claims the benefit of priority of Chinese Patent Application No. 202110571326.X filed on May 25, 2021. The contents of the above applications are all incorporated by reference as if fully set forth herein in their entirety.

FIELD OF INVENTION

The present application relates to a field of display technology and more particularly to a field sequential liquid crystal display device.

BACKGROUND OF INVENTION

At present, display modules are generally composed of a liquid crystal display panel and a backlight module. The liquid crystal display panel is positioned on a light-emitting side of the backlight module. The liquid crystal display panel includes a color film substrate and an array substrate opposite to the color film substrate. The color film substrate includes a color film layer, wherein the color film layer includes a red color resist, a blue color resist, and a green color resist, and wherein white light emitted by the backlight module passes through the red color resist, the green color resist, and the blue color resist, and then respectively turns into red light, green light, and blue light, in this way, the display module can display color images.

However, brightness of the white light emitted by the backlight module after passing through the color film layer will be greatly reduced. Therefore, a high-brightness backlight is required, which consumes more power consumption. Therefore, a color sequence display has appeared, which adopts a method of timed color mixing to display color effects with the backlight of different colors and the liquid crystal display panel, and the color film layer can be removed to save costs. However, an added value of color sequence displays is still to be developed.

SUMMARY OF INVENTION

A purpose of the present application is to provide a field sequential liquid crystal display device to improve a utilization of the blank period of the field sequential liquid crystal display device.

In order to solve the above problems, the technical solutions provided by the embodiments of the present application are as follows:

A field sequential liquid crystal display device, including: a liquid crystal display module including a plurality of display data writing periods and a plurality of blank periods, wherein between every two adjacent ones of the display data writing periods is provided with one of the plurality of blank periods, and the liquid crystal display module is configured to receive a display data during the plurality of display data writing periods; and a functional module configured to detect a functional data in at least one of the plurality of blank periods; wherein the liquid crystal display module includes a field sequential backlight module configured to provide backlight during a plurality of backlight turned-on periods, and each of the plurality of backlight turned-on periods is within one of the plurality of blank periods; wherein each of the plurality of blank periods includes a liquid crystal response period, and a duration of one of the backlight turned-on periods is longer than or equal to a duration of one of the liquid crystal response periods; and wherein a duration of one of the blank periods is longer than a duration of one of the display data writing periods.

In the above mentioned field sequential liquid crystal display device, the functional module includes an optical fingerprint recognition module, and the optical fingerprint recognition module is configured to detect a fingerprint data by using the backlight provided by the field sequential backlight module as a light source during the backlight turned-on periods.

In the above mentioned field sequential liquid crystal display device, the optical fingerprint recognition module is further configured to detect a background data during the plurality of liquid crystal response periods, and the field sequential liquid crystal display device generates a corrected fingerprint data based on the background data and the fingerprint data.

In the above mentioned field sequential liquid crystal display device, the fingerprint data minus the background data is equal to the corrected fingerprint data.

In the above mentioned field sequential liquid crystal display device, the field sequential backlight module includes a green light-emitting unit, and the optical fingerprint recognition module is configured to use a green light emitted by the green light-emitting unit as a light source during the backlight turned-on periods.

In the above mentioned field sequential liquid crystal display device, the liquid crystal display module is configured to display a green image in one of sub-frame periods, wherein the one of sub-frame periods corresponding to the green image is composed of one of the plurality of data writing periods and one of the plurality of blank periods, and the fingerprint recognition module is configured to detect the fingerprint data in a time period that the blank period corresponding to the green image coincides with the backlight turned-on period.

In the above mentioned field sequential liquid crystal display device, the functional module further comprises a capacitive touch module configured to detect touch data during the plurality of blank periods.

In the above-mentioned field sequential liquid crystal display device, the liquid crystal display module includes a common electrode, and the common electrode is multiplexed as a touch electrode.

In the above field sequential liquid crystal display device, the liquid crystal display module has a first sub-frame period, a second sub-frame period, and a third sub-frame period, and the liquid crystal display module is configured to display a red image during the first sub-frame period of one of image frames, display a green image during the second sub-frame period of the one of the image frames, and display a blue image during the third sub-frame period of the one of the image frames, and wherein the first sub-frame period, the second sub-frame period, and the third sub-frame period all comprise at least one of the plurality of blank periods; and wherein the touch module is configured to detect the touch data during the at least one of the plurality of blank periods of the first sub-frame period of the one of the image frames, during the at least one of the plurality of blank periods of the second sub-frame period of the one of the image frames, and during the at least one of the plurality of blank periods of the third sub-frame period of the one of the image frames.

In the above-mentioned field sequential liquid crystal display device, the first sub-frame period, the second sub-frame period, and the third sub-frame period all include the plurality of blank periods;

the touch module is configured to detect the touch data during all of the plurality of blank periods of the first sub-frame period, the plurality of blank periods of the second sub-frame period, and the plurality of blank periods of the third sub-frame period.

In the above-mentioned field sequential liquid crystal display device, a duration of one of the blank periods is longer than a duration of one of the display data writing periods.

The present application provides a field sequential liquid crystal display device, which detects a functional data in at least one of the plurality of blank periods by a functional module, to make full use of the plurality of blank periods of the field sequential liquid crystal display device and improve a utilization rate of the plurality of blank periods of the field sequential liquid crystal display device.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps shall fall within a protection scope of the present application.

Figure 1:
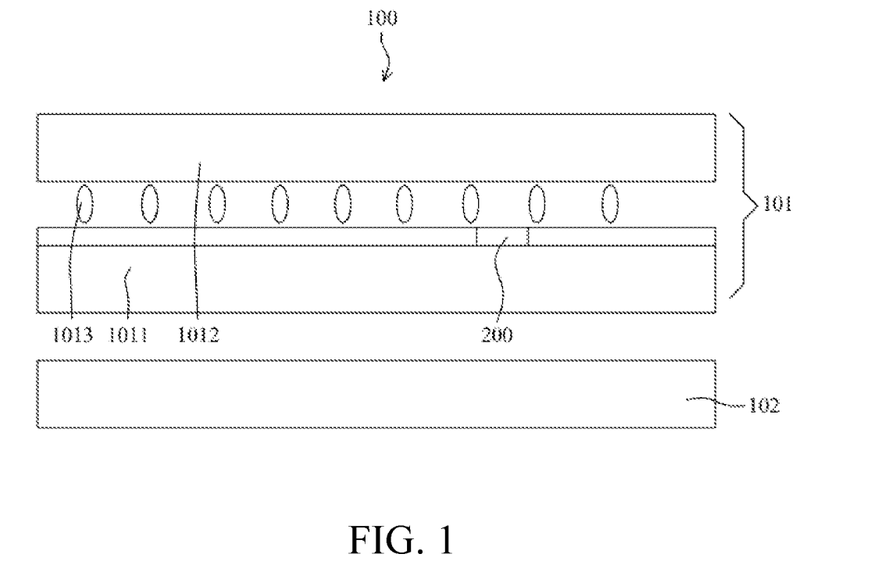
FIG. 1 is a schematic diagram of a field sequential liquid crystal display device according to one embodiment of the present application.

As shown in FIG. 1, FIG. 1 is a schematic diagram of a field sequential liquid crystal display device according to one embodiment of the present application. The field sequential liquid crystal display device 100 includes a liquid crystal display module and a functional module 200, wherein the liquid crystal display module includes a liquid crystal display panel 101 and a field sequential backlight module 102.

In this embodiment, the liquid crystal display panel 101 is configured to receive backlight emitted by the field sequential backlight module 102 to display images. The liquid crystal display panel 101 includes an array substrate 1011 and a counter substrate 1012. The array substrate 1011 and the counter substrate 1012 are disposed opposite to each other, and a liquid crystal layer 1013 is disposed between the array substrate 1011 and the counter substrate 1012. The array substrate 1011 includes a thin film transistor, a pixel electrode, and a common electrode. The thin film transistor may be at least one of a polysilicon transistor, an amorphous silicon transistor, or a metal oxide transistor. The thin film transistor is electrically connected to the pixel electrode, and the thin film transistor is configured as switches to control whether the display data signal is written to the pixel electrode. When the pixel electrode is written the display data, the common electrode is written a fixed potential, an electric field is formed between the common electrode and the pixel electrode, and the electric field controls a deflection of the liquid crystal molecules in the liquid crystal layer 1013. The pixel electrode and the common electrode are made of indium tin oxide.

In this embodiment, the field sequential backlight module 102 is configured to provide backlight during the backlight turned-on period. The field sequential backlight module 102 includes a red light emitting unit, a blue light emitting unit, and a green light emitting unit. The red light emitting unit includes a red LED chip, the blue light emitting unit includes a blue LED chip, and the green light emitting unit includes a green LED chip. The red LED chip emits red light, the blue LED chip emits blue light, and the green LED chip emits green light. The red LED chip, the blue LED chip, and the green LED chip may be any one of a mini-LED or a micro-LED.

Figure 2:
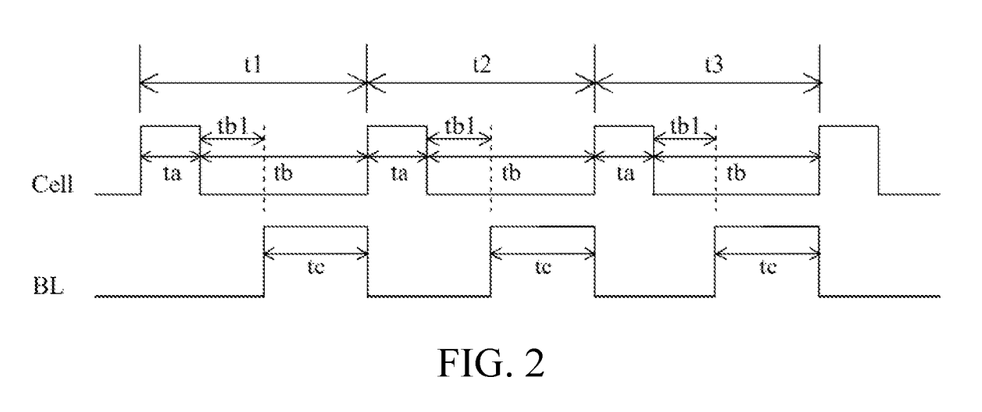
FIG. 2 is a first working sequence diagram of the liquid crystal display panel and the field sequential backlight module shown in FIG. 1.

In this embodiment, as shown in FIG. 2, FIG. 2 is a first working sequence diagram of the liquid crystal display panel and the field sequential backlight module shown in FIG. 1, wherein Cell is a display data and BL is backlight data. When the liquid crystal display panel 101 displays one frame of images, a period of one frame of images includes a first sub-frame period t1, a second sub-frame period t2, and a third sub-frame period t3. The first sub-frame period t1, the second sub-frame period t2, and the third sub-frame period t3 are composed of one display data writing period ta and one blank period tb, wherein in the display data writing period ta, the pixel electrode of the liquid crystal display panel 101 is written the display data Cell. After the display data writing period ta, the liquid crystal display panel 101 enters a liquid crystal response period tb1 in the blank period tb, and in the liquid crystal display respond period tb1, liquid crystals in the liquid crystal display panel 101 is deflected under an action of the electric field formed by the pixel electrode and the common electrode. When the liquid crystals are deflected to a target state or close to the target state under the action of the electric field, the field sequential backlight module 102 enters the backlight turned-on period tc. In the backlight turned-on period tc, and the field sequential backlight module 102 is turned on and receives the backlight data BL to emit the backlight. After the backlight enters the liquid crystal display panel 101, the liquid crystal display panel 101 displays a corresponding image. The backlight turned-on period tc of the field sequential backlight module 102 is within the blank period tb of the liquid crystal display panel 101, and a start time point of the backlight turned-on period tc of the field sequential backlight module 102 is at an end of the liquid crystal response period tb1, or a start point of the backlight turned-on period tc of the field sequential backlight module 102 is before the liquid crystal response period tb1. In addition, in the first sub-frame period t1, the red LED chip of the field sequential backlight module 102 emits red light and the red light passes through the liquid crystal display panel 101 to display a first sub-frame image (red image); in the second sub-frame period t2, the green LED chip of the field sequential backlight module 102 emits green light and the green light passes through the liquid crystal display panel 101 to display the second sub-frame image (green image); in the third sub-frame period t3, the blue LED chip of the field sequential backlight module 102 emits blue light and the blue light passes through the liquid crystal display panel 101 to display the third sub-frame image (blue image). In the time of one frame of image, the first sub-frame image, the second sub-frame image, and the third sub-frame image are accumulated and mixed in time to display one frame of color image, wherein frequencies of the first sub-frame image, the second sub-frame image, and the third sub-frame image are equal. Since a color sequence method divides the color image into a first sub-frame image corresponding to red light, a second sub-frame image corresponding to green light, and a third sub-frame image corresponding to blue light, the frequencies of the first sub-frame image, the second sub-frame image, and the third sub-frame image are at least equal to 180 Hz, so that the frequency of one frame of image is 60 Hz.

Figure 3:
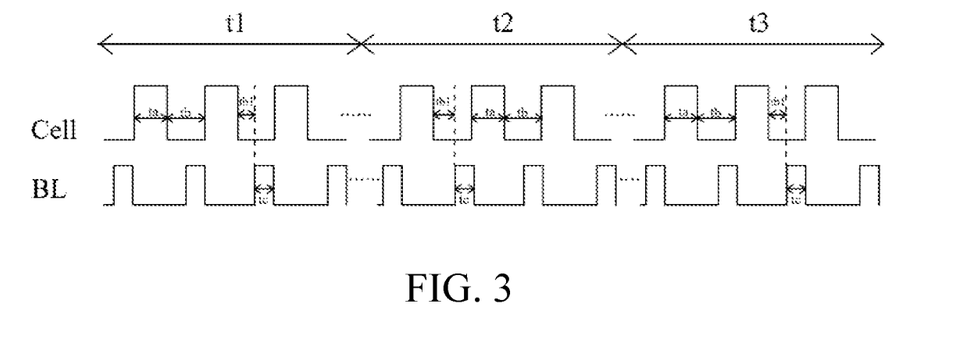
FIG. 3 is a second working sequence diagram of the liquid crystal display panel and the field sequential backlight module shown in FIG. 1.

In this embodiment, as shown in FIG. 3, FIG. 3 is a second working sequence diagram of the liquid crystal display panel and the field sequential backlight module shown in FIG. 1. The working sequence diagram shown in FIG. 3 is basically similar to the working sequence diagram shown in FIG. 2, except that in the period of one frame of image, the first sub-frame period t1, the second sub-frame period t2, and the third sub-frame period t3 are composed of a plurality of display data writing periods ta and a plurality of blank periods tb, and wherein one blank period tb corresponds to one display data writing period ta.

In FIG. 2, the blank period tb is positioned between the display data writing periods ta of two adjacent sub-frame periods; while in FIG. 3, the blank period tb is positioned between two adjacent display data writing periods ta in one sub-frame period. The blank period tb in FIG. 3 is also positioned between two adjacent display data writing periods ta of two adjacent sub-frame periods. In a situation that a duration of one frame of the image of the embodiment of FIG. 2 is the same as a duration of one frame of the image of the embodiment of FIG. 3, a duration of each blank period tb of FIG. 3 is shorter than a duration of each of blank period tb of FIG. 2, and a duration of each display data writing period ta of FIG. 3 is shorter than a duration of each display data writing period ta of FIG. 2.

In this embodiment, a duration corresponding to the backlight turned-on period tc is greater than or equal to a duration corresponding to the liquid crystal response period tb1, so that the backlight turned-on period tc is long enough to reduce a total power consumption of the field sequential backlight module to display a sub-frame image on the liquid crystal display panel. A ratio between the duration of the backlight turned-on period tc and the duration of the liquid crystal response period tb1 is greater than or equal to 1 and less than or equal to 2.5. For example, when the frequency of one frame is 60 Hz, the duration corresponding to the backlight turned-on period tc ranges from 4 milliseconds to 8 milliseconds, and the duration corresponding to the liquid crystal response period tb1 ranges from 3 milliseconds to 4 milliseconds.

In this embodiment, since the blank time of the field sequential liquid crystal display device 100 is longer than the blank time of other liquid crystal display devices, the functional module 200 is configured to detect the function data during at least one blank period tb, therefore, the blank time for displaying one frame of image is fully utilized, and an added value of the field sequential liquid crystal display device 100 is improved.

In this embodiment, a duration of one of the blank periods tb is longer than a duration of one of the display data writing periods ta, to provide enough time for the functional module 200 to detect the functional data during the blank period tb, which is more conducive to accurately realize the detection of the functional data. For example, a ratio of the duration corresponding to the blank period tb to the duration corresponding to the display data writing period ta ranges from 1.5 to 3.5 to ensure that if the duration corresponding to the display data writing period ta is sufficient, the duration corresponding to the blank period tb is sufficient.

In this embodiment, the functional module 200 includes an optical fingerprint identification module. The optical fingerprint identification module needs to detect fingerprint data, and when a valid fingerprint data is detected, realizes fingerprint unlock or open an application according to the valid fingerprint data. The optical fingerprint recognition module can be integrated in the liquid crystal display panel 101, and the optical fingerprint recognition module can also be provided outside the liquid crystal display panel 101. The optical fingerprint recognition module includes a photoelectric sensor. When the optical fingerprint recognition module is integrated on the liquid crystal display panel 101, the photoelectric sensor can be manufactured by using a thin film transistor manufacturing process. The working principle of the optical fingerprint recognition module is that when a finger touches the field sequential liquid crystal display device 100, a skin surface of the finger has a plurality of ridges and multiple valleys, wherein the plurality of ridges and valleys of the fingerprint have different reflectivity to light, making intensities of the reflected light received by the photoelectric sensor different. Correspondingly, the reflected light formed at the position of the ridge and the reflected light formed at the position of the valley make the current signals output by the conversion layer different in magnitude, and then the optical fingerprint recognition module generates fingerprint images according to the different current signals.

In this embodiment, the optical fingerprint recognition module is configured to detect fingerprint data using the backlight provided by the field sequential backlight module 102 as the light source during the backlight turned-on period tc, to prevent the need for other independent light sources to provide the backlight for the optical fingerprint recognition module. Specifically, the optical fingerprint recognition module is configured to use the light emitted by the green light emitting unit as the light source during the backlight turned-on period tc to increase an intensity of the reflected light received by the optical fingerprint recognition module and improve the fingerprint data collection accuracy of the optical fingerprint recognition module. It is understandable that a light source other than the field sequential backlight module 102 may also be used to provide light.

Figure 4:
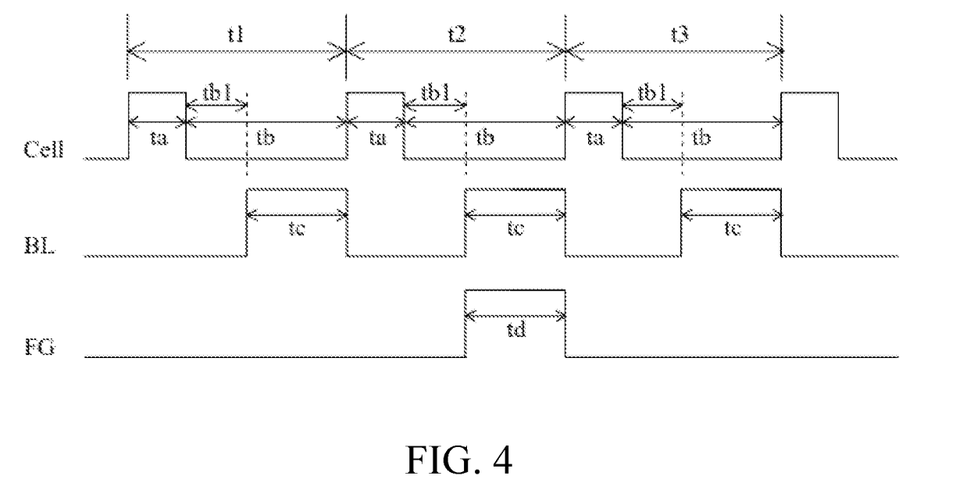
FIG. 4 is a working sequence diagram of the field sequential liquid crystal display device shown in FIG. 1 for detecting a fingerprint data.

Specifically, as shown in FIG. 4, FIG. 4 is a working sequence diagram of the field sequential liquid crystal display device shown in FIG. 1, wherein FG is a signal for detecting the fingerprint data. The second sub-frame period t2 is composed of one display data writing period ta and one blank period tb, a fingerprint detection period td of the optical fingerprint recognition module coincides with the blank period tb of the second sub-frame period t2 and completely coincides with the period during backlight turned-on period tc. That is, the fingerprint recognition module is configured to detect the fingerprint data in a time period that the blank period tb corresponding to the green image coincides with the backlight turned-on period tc, so that the optical fingerprint recognition module uses the green backlight from the field sequential backlight module 102 as the light source, and meets the requirement of longer detection time of the optical fingerprint recognition module at the same time. When the second sub-frame period t2 is composed of one display data writing period ta and one blank period tb, the blank period tb has a longer duration, while the general optical fingerprint detection requires a longer time, so the fingerprint detection period td is set during the blank period tb of the second sub-frame period t2 to ensure that the fingerprint detection period td can be sufficiently long.

It should be noted that when the red light, green light, and blue light are accumulated in time to form white light, an intensity of green light is the highest, and a light intensity of green light reflected by the finger is also the highest, making a photoelectric sensor in the optical fingerprint recognition module receive greater intensity of the reflected light, which is more conducive to conversion into an effective current. In addition, using green light as the light source for optical fingerprint recognition can ensure that a noise in the fingerprint data detection process is less.

In this embodiment, the optical fingerprint recognition module is configured to detect a background data during the liquid crystal response period tb1 or the display data writing period, the background data includes ambient light and other light received by the photoelectric sensor after being reflected by the finger, and the corresponding current causes noise in the detection of fingerprint data. A time period which the optical fingerprint recognition module detects the background data and a time period which the optical fingerprint recognition module detects the fingerprint data may be within one blank period, or the time period which the optical fingerprint recognition module detects the background data and time period which the optical fingerprint recognition module detects the fingerprint data may be within one sub-frame period. The field sequential liquid crystal display device 100 generates a corrected fingerprint data based on the background data and the fingerprint data, and the corrected fingerprint data is the fingerprint data after removing the noise, which improves an accuracy of the target fingerprint data, and thereby improves the accuracy of fingerprint recognition. Specifically, the fingerprint data minus the background data is equal to the corrected fingerprint data.

In this embodiment, the functional module 200 further includes a capacitive touch module. The capacitive touch module is a self-capacitive touch module, specifically, a touch position information is determined by detecting a change in capacitance of a touch electrode. It can be understood that the capacitive touch module may also be a mutual capacitive touch module. The capacitive touch module is configured to detect touch data during the plurality of blank period tb.

Figure 5:
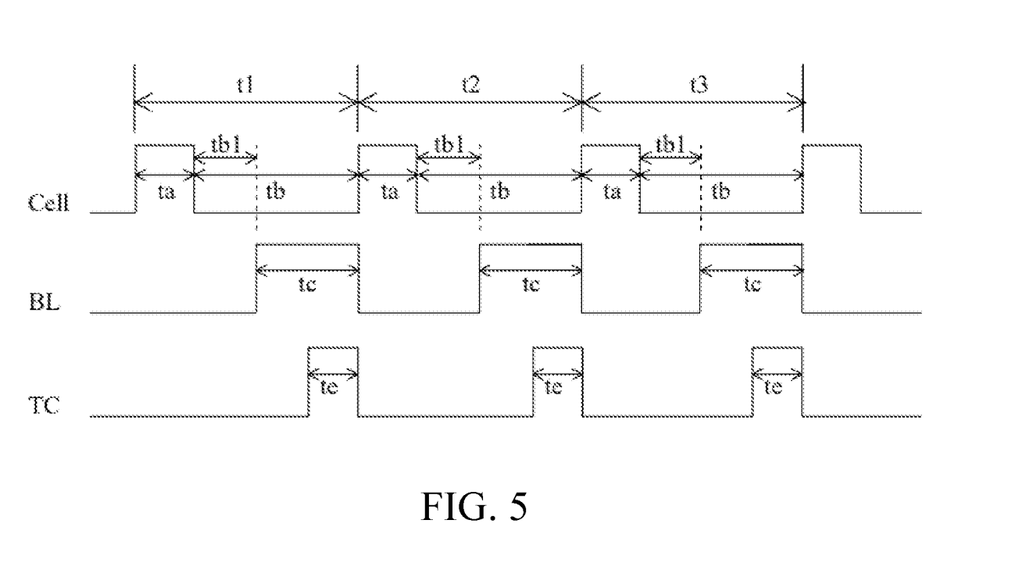
FIG. 5 is a first working sequence diagram of the field sequential liquid crystal display device shown in FIG. 1 for detecting a touch data.

Specifically, as shown in FIG. 5, FIG. 5 is a first working sequence diagram of the field sequential liquid crystal display device shown in FIG. 1 for detecting a touch data, wherein TC is a signal for detecting touch data. The first sub-frame period t1, the second sub-frame period t2, and the third sub-frame period t3 are all composed of one display data writing period to and one blank period tb. The capacitive touch module detects touch data within a period that the blank period tb of each sub-frame period coincides with the backlight turned-on period tc, that is, the touch detection period to is within the backlight turned-on period tc. At least one touch detection is performed in each of the first sub-frame period t1, the second sub-frame period t2, and the third sub-frame period t3, and the touch report point is performed once in each sub-frame period. A frequency of each frame is 120 Hz, and a frequency of each sub-frame is 360 Hz. Correspondingly, a touch report rate can reach 360 Hz. While making full use of the plurality of blank period, it is beneficial to improve the touch report rate and touch sensitivity. It is understandable that the capacitive touch module can also detect touch data during the liquid crystal response period tb1, and the capacitive touch module can also detect touch data during the liquid crystal response period tb1 and the backlight turned-on period tc.

Figure 6:
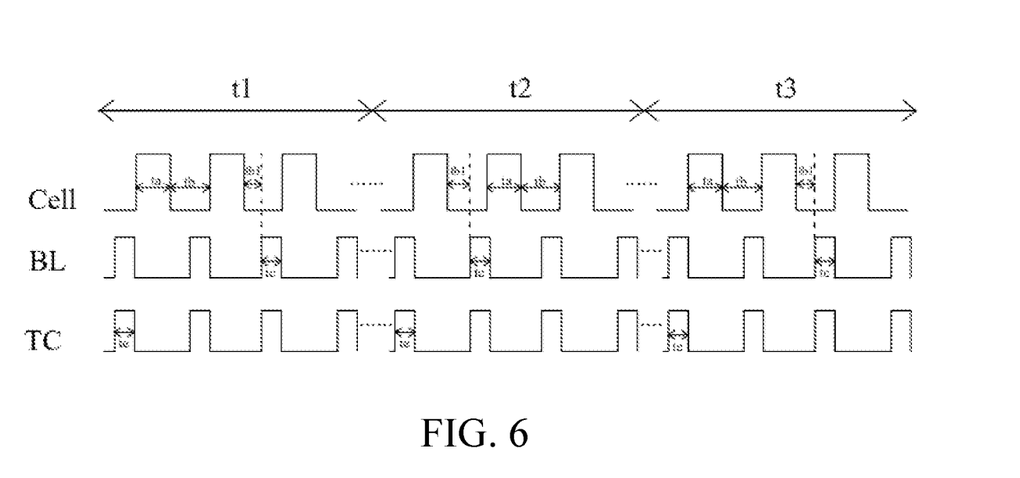
FIG. 6 is a second working sequence diagram of the field sequential liquid crystal display device shown in FIG. 1 for detecting the touch data.

As shown in FIG. 6, FIG. 6 is a second working sequence diagram of the field sequential liquid crystal display device shown in FIG. 1 for detecting the touch data. Each of the first sub-frame period t1, the second sub-frame period t2, and the third sub-frame period t3 includes more than one blank periods tb and more than one display data writing period ta. The touch data detection is performed twice in the blank period of each sub-frame period of the first sub-frame period t1, the second sub-frame period t2, and the third sub-frame period t3, and a point is reported at least once in each sub-frame. It is understandable that multiple touch data detections can also be performed in the blank period tb of each sub-frame period of the first sub-frame period t1, the second sub-frame period t2, and the third sub-frame period t3 to improve the touch report rate.

It should be noted that since time required for one touch data detection is about milliseconds, that is, time required for touch data detection is relatively short, one or more touch control detections can be performed during the blank period of each sub-frame period, the more times the touch data is detected in the blank period of each sub-frame period, the better to improve the touch report rate.

Figure 7:
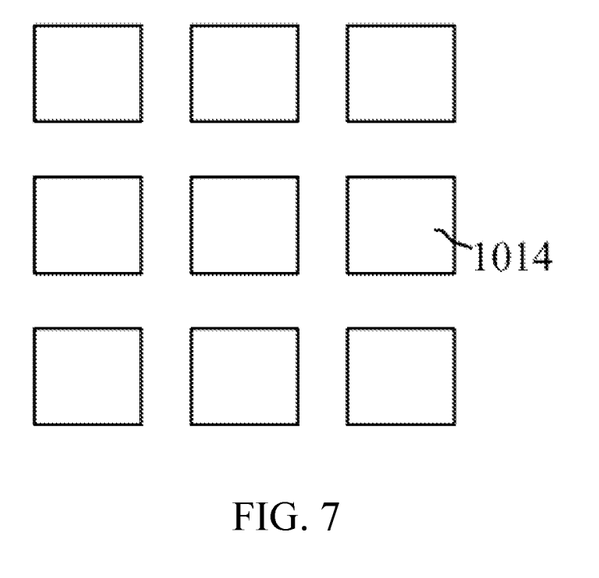
FIG. 7 is a schematic diagram of a common electrode of the liquid crystal display panel shown in FIG. 1.

In this embodiment, the common electrodes are multiplexed as touch electrode of the capacitive touch module, that is, the common electrodes are time-division multiplexed. As shown in FIG. 7, a shape of each of the plurality of the common electrodes 1014 may be rectangular, and the plurality of common electrodes 1014 are used as a plurality of self-capacitive touch electrodes, to prevent the requirement of needing one independent film for manufacturing the touch electrodes, and simplify a process of manufacturing the field sequential liquid crystal display device 100.

In this embodiment, the field sequential liquid crystal display device 100 further includes an integrated driver chip (not shown), the integrated driver chip integrates the functions of a touch chip and a display chip, the integrated driver chip can send the display data to the liquid crystal display module and send the touch detection data to the capacitive module, that is, the field sequential liquid crystal display device 100 is also a touch display driver integrated (TDDI) display device.

Figure 8:
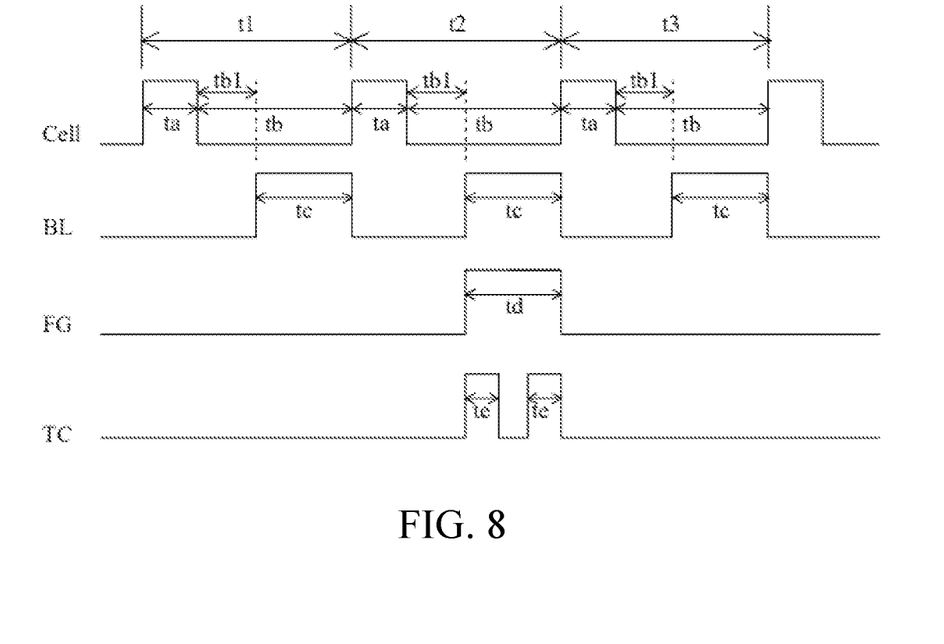
FIG. 8 is a working sequence diagram of the field sequential liquid crystal display device shown in FIG. 1 for detecting the fingerprint data and the touch data at the same time.

In this embodiment, as shown in FIG. 8, while the optical fingerprint recognition module detects fingerprint data in the blank period tb, the capacitive touch module detects the touch data, that is, when a finger touches the field sequential liquid crystal display device 100, the detection of touch control data and the detection of fingerprint data are performed at the same time.

Specifically, the period of one frame of image includes a first sub-frame period t1, a second sub-frame period t2, and a third sub-frame period t3, wherein the first sub-frame period t1, the second sub-frame period t2, and the third sub-frame period t3 are composed of one display data writing period to and one blank period tb. The first sub-frame period t1, the second sub-frame period t2, and the third sub-frame period t3 are as described above and will not be described in detail here. The fingerprint detection module detects the fingerprint data during a period that the blank period tb of the second sub-frame period t2 coincides with the backlight turned-on period tc, and the capacitive touch module detects one or more touch data in the period that the blank period tb of the second sub-frame period t2 coincides with the backlight on period tc.

The fingerprint detection period td of the fingerprint detection module coincides with the touch detection period to of the capacitive touch module.

It should be noted that the detection of fingerprint data is a process in which the phototransistor is turned on by scanning, and the phototransistor receives the light reflected by the fingerprint to generate a current. The current is received and processed by the fingerprint chip to obtain the fingerprint image. This process is completed in the fingerprint chip, and is not a fingerprint data detection process. Touch data detection is performed by writing electrical signals to the touch electrodes, and makes the touch electrodes form self-capacitance. When a finger touches, a capacitance of the touch electrodes changes, and after the information corresponding to the capacitance change is transmitted to the integrated driving chip, the integrated driving chip calculates the position coordinate information of the touch according to the corresponding position of the touch electrode of the capacitance change. Therefore, the fingerprint data detection and the touch data detection are performed in at least one of the plurality of blank periods tb, and the fingerprint image synthesis and the calculation of the touch position coordinates are performed inside the chip.

The description of the above embodiments is only used to help understand the technical solutions and core ideas of the present application; those of ordinary skill in the art should understand that they can still modify the technical solutions recorded in the foregoing embodiments, or modify some of the technologies. The features are equivalently replaced; and these modifications or replacements do not cause the essence of the corresponding technical solutions to deviate from the scope of the technical solutions of the embodiments of the present application.

What is claimed is:

1. A field sequential liquid crystal display device, comprising:
a liquid crystal display module comprising a plurality of display data writing periods and a plurality of blank periods, wherein between every two adjacent ones of the display data writing periods is provided with one of the plurality of blank periods, and the liquid crystal display module is configured to receive a display data during the plurality of display data writing periods; and
a functional module configured to detect a functional data in at least one of the plurality of blank periods;
wherein the liquid crystal display module comprises a field sequential backlight module configured to provide backlight during a plurality of backlight turned-on periods, and each of the plurality of backlight turned-on periods is within one of the plurality of blank periods;
wherein each of the plurality of blank periods comprises a liquid crystal response period, and a duration of one of the backlight turned-on periods is longer than or equal to a duration of one of the liquid crystal response periods; and
wherein a duration of one of the blank periods is longer than a duration of one of the display data writing periods.

2. The field sequential liquid crystal display device according to claim 1, wherein the functional module comprises an optical fingerprint recognition module, and the optical fingerprint recognition module is configured to detect a fingerprint data by using the backlight provided by the field sequential backlight module as a light source during the backlight turned-on periods.

3. The field sequential liquid crystal display device according to claim 2, wherein the optical fingerprint recognition module is further configured to detect a background data during the plurality of liquid crystal response periods, and the field sequential liquid crystal display device generates a corrected fingerprint data based on the background data and the fingerprint data.

4. The field sequential liquid crystal display device according to claim 3, wherein the fingerprint data minus the background data is equal to the corrected fingerprint data.

5. The field sequential liquid crystal display device according to claim 2, wherein the field sequential backlight module comprises a green light-emitting unit, and the optical fingerprint recognition module is configured to use a green light emitted by the green light-emitting unit as a light source during the backlight turned-on periods.

6. The field sequential liquid crystal display device according to claim 5, wherein the liquid crystal display module is configured to display a green image in one of sub-frame periods, wherein the one of sub-frame periods corresponding to the green image is composed of one of the plurality of data writing periods and one of the plurality of blank periods, and
the optical fingerprint recognition module is configured to detect the fingerprint data in a time period that the blank period corresponding to the green image coincides with the backlight turned-on period.

7. The field sequential liquid crystal display device according to claim 1, wherein the functional module further comprises a capacitive touch module configured to detect touch data during the plurality of blank periods.

8. The field sequential liquid crystal display device according to claim 7, wherein the liquid crystal display module has a first sub-frame period, a second sub-frame period, and a third sub-frame period, and the liquid crystal display module is configured to display a red image during the first sub-frame period of one of image frames, display a green image during the second sub-frame period of the one of the image frames, and display a blue image during the third sub-frame period of the one of the image frames, and wherein the first sub-frame period, the second sub-frame period, and the third sub-frame period all comprise at least one of the plurality of blank periods; and
wherein the touch module is configured to detect the touch data during the at least one of the plurality of blank periods of the first sub-frame period of the one of the image frames, during the at least one of the plurality of blank periods of the second sub-frame period of the one of the image frames, and during the at least one of the plurality of blank periods of the third sub-frame period of the one of the image frames.

9. A field sequential liquid crystal display device, comprising:
a liquid crystal display module comprising a plurality of display data writing periods and a plurality of blank periods, wherein between every two adjacent ones of the display data writing periods is provided with one of the plurality of blank periods, and the liquid crystal display module is configured to receive a display data during the plurality of display data writing periods; and
a functional module configured to detect a functional data in at least one of the plurality of blank periods.

10. The field sequential liquid crystal display device according to claim 9, wherein the liquid crystal display module comprises a field sequential backlight module configured to provide backlight during a plurality of backlight turned-on periods, and each of the plurality of backlight turned-on periods is within one of the plurality of blank periods; and
wherein each of the plurality of blank periods comprises a liquid crystal response period, and a duration of one of the backlight turned-on periods is longer than or equal to a duration of one of the liquid crystal response periods.

11. The field sequential liquid crystal display device according to claim 10, wherein the functional module comprises an optical fingerprint recognition module, and the optical fingerprint recognition module is configured to detect a fingerprint data by using the backlight provided by the field sequential backlight module as a light source during the backlight turned-on periods.

12. The field sequential liquid crystal display device according to claim 11, wherein the optical fingerprint recognition module is further configured to detect a background data during the plurality of liquid crystal response periods, and the field sequential liquid crystal display device generates a corrected fingerprint data based on the background data and the fingerprint data.

13. The field sequential liquid crystal display device according to claim 12, wherein the fingerprint data minus the background data is equal to the corrected fingerprint data.

14. The field sequential liquid crystal display device according to claim 11, wherein the field sequential backlight module comprises a green light-emitting unit, and the optical fingerprint recognition module is configured to use a green light emitted by the green light-emitting unit as a light source during the backlight turned-on periods.

15. The field sequential liquid crystal display device according to claim 14, wherein the liquid crystal display module is configured to display a green image in one of sub-frame periods, wherein the one of sub-frame periods corresponding to the green image is composed of one of the plurality of data writing periods and one of the plurality of blank periods, and
the optical fingerprint recognition module is configured to detect the fingerprint data in a time period that the blank period corresponding to the green image coincides with the backlight turned-on period.

16. The field sequential liquid crystal display device according to claim 9, wherein the functional module further comprises a capacitive touch module configured to detect touch data during the plurality of blank periods.

17. The field sequential liquid crystal display device according to claim 16, wherein the liquid crystal display module comprises a common electrode multiplexed as a touch electrode.

18. The field sequential liquid crystal display device according to claim 16, wherein the liquid crystal display module has a first sub-frame period, a second sub-frame period, and a third sub-frame period, and the liquid crystal display module is configured to display a red image during the first sub-frame period of one of image frames, display a green image during the second sub-frame period of the one of the image frames, and display a blue image during the third sub-frame period of the one of the image frames, and wherein the first sub-frame period, the second sub-frame period, and the third sub-frame period all comprise at least one of the plurality of blank periods; and
wherein the touch module is configured to detect the touch data during the at least one of the plurality of blank periods of the first sub-frame period of the one of the image frames, during the at least one of the plurality of blank periods of the second sub-frame period of the one of the image frames, and during the at least one of the plurality of blank periods of the third sub-frame period of the one of the image frames.

19. The field sequential liquid crystal display device according to claim 18, wherein the first sub-frame period, the second sub-frame period, and the third sub-frame period all include the plurality of blank periods; and
the touch module is configured to detect the touch data during all of the plurality of blank periods of the first sub-frame period, the plurality of blank periods of the second sub-frame period, and the plurality of blank periods of the third sub-frame period.

20. The field sequential liquid crystal display device according to claim 9, wherein a duration of one of the blank periods is longer than a duration of one of the display data writing periods.

* * * * *